(12) United States Patent
Granovsky et al.

(10) Patent No.: US 9,032,102 B2
(45) Date of Patent: May 12, 2015

(54) DECODE DATA FOR FAST PCI EXPRESS MULTI-FUNCTION DEVICE ADDRESS DECODE

(75) Inventors: Ilya Granovsky, Haifa (IL); Etai Adar, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/411,203

(22) Filed: Mar. 2, 2012

(65) Prior Publication Data

US 2013/0232279 A1 Sep. 5, 2013

(51) Int. Cl.
*G06F 13/36* (2006.01)
*G06F 9/30* (2006.01)

(52) U.S. Cl.
CPC ............ *G06F 9/30145* (2013.01); *G06F 13/36* (2013.01)

(58) Field of Classification Search
CPC .............................. G06F 9/30145; G06F 13/36
USPC ............................................................ 710/3
See application file for complete search history.

(56) References Cited

U.S. PATENT DOCUMENTS

| 7,694,047 B1 | 4/2010 | Alston | |
|---|---|---|---|
| 2006/0206899 A1* | 9/2006 | Suzuki et al. | 718/104 |
| 2007/0101154 A1* | 5/2007 | Bardsley et al. | 713/186 |
| 2007/0118763 A1* | 5/2007 | Kamei | 713/190 |
| 2008/0075175 A1* | 3/2008 | Takahashi et al. | 375/240.28 |
| 2008/0288661 A1* | 11/2008 | Galles | 710/3 |
| 2009/0006932 A1 | 1/2009 | Biran et al. | |
| 2009/0043921 A1* | 2/2009 | Roy | 710/31 |
| 2009/0248973 A1 | 10/2009 | Deshpande et al. | |
| 2009/0296740 A1* | 12/2009 | Wagh et al. | 370/475 |
| 2010/0251055 A1* | 9/2010 | Murakami et al. | 714/748 |
| 2010/0312942 A1* | 12/2010 | Blinick et al. | 710/316 |
| 2011/0082949 A1* | 4/2011 | Matthews et al. | 710/1 |
| 2011/0206051 A1 | 8/2011 | Suzuki | |
| 2012/0185632 A1* | 7/2012 | Lais et al. | 710/308 |

OTHER PUBLICATIONS

International Search Report and Written Opinion of the ISA dated Jul. 25, 2013—International Application No. PCT/IB2013/051507.

* cited by examiner

*Primary Examiner* — Henry Tsai
*Assistant Examiner* — John Roche
(74) *Attorney, Agent, or Firm* — International IP Law Group, PLLC

(57) ABSTRACT

An apparatus and method of fast PCIe multi-function device address decode utilizing a target function data look up table. One or more decode directives (e.g., targeted functions) are provided within the PCIe request packet, thereby eliminating the need for target function search during the decode process in the endpoint device. This enables single-decoder single-step decode implementation in complex multi-function devices.

20 Claims, 5 Drawing Sheets

DECODE DATA FOR FAST PCI EXPRESS MULTI-FUNCTION DEVICE ADDRESS DECODE

FIELD OF THE INVENTION

The present invention relates to the field of data communications, and more particularly relates to an apparatus and method of fast PCIe multi-function device address decode utilizing a target function data look up table.

BACKGROUND OF THE INVENTION

Peripheral Component Interconnect Express (PCIe) is a computer expansion card standard designed to replace older PCI, PCI-X, and AGP bus standards. Recent revisions of the PCIe standard support hardware I/O virtualization. PCIe is based on point-to-point topology, with separate serial links connecting every device to the root complex (host). A PCIe bus link supports full-duplex communication between any two endpoints, with no limitation on concurrent access across multiple endpoints. PCIe communications are encapsulated in packets where the work of packetizing and de-packetizing data and status-message traffic is handled by the transaction layer of the PCIe port.

SUMMARY OF THE INVENTION

There is thus provided in accordance with the invention, a method of PCI Express (PCIe) address decoding, the method comprising providing a look up table in a PCIe host, the look up table operative to perform a mapping from an address range to a target function and utilizing the look up table, sending a PCIe endpoint an address and suggested target function, decoding at the PCIe endpoint the received address utilizing the suggested target function and verifying suggested target function information.

There is also provided in accordance with the invention, a method of PCI Express (PCIe) address decoding for use in a PCIe host, the method comprising receiving PCIe requests, each having an address, determining a target device function in accordance with each the address and assigning the target functions to requests issued to PCIe endpoints.

There is further provided in accordance with the invention, a method of PCI Express (PCIe) address decoding for use in a PCIe host, the method comprising scanning PCIe devices and functions during a PCIe bus initialization phase, assigning address ranges to functions and constructing a look up table mapping the address ranges to the target functions.

There is also provided in accordance with the invention, a method of PCI Express (PCIe) address decoding for use in a PCIe endpoint, the method comprising receiving a read/write request packet from a PCIe host, determining if the request packet comprises suggested target function data and if so, validating the target function data received in the packet.

BRIEF DESCRIPTION OF THE DRAWINGS

The invention is herein described, by way of example only, with reference to the accompanying drawings, wherein.

DETAILED DESCRIPTION OF THE INVENTION

Figure 1:
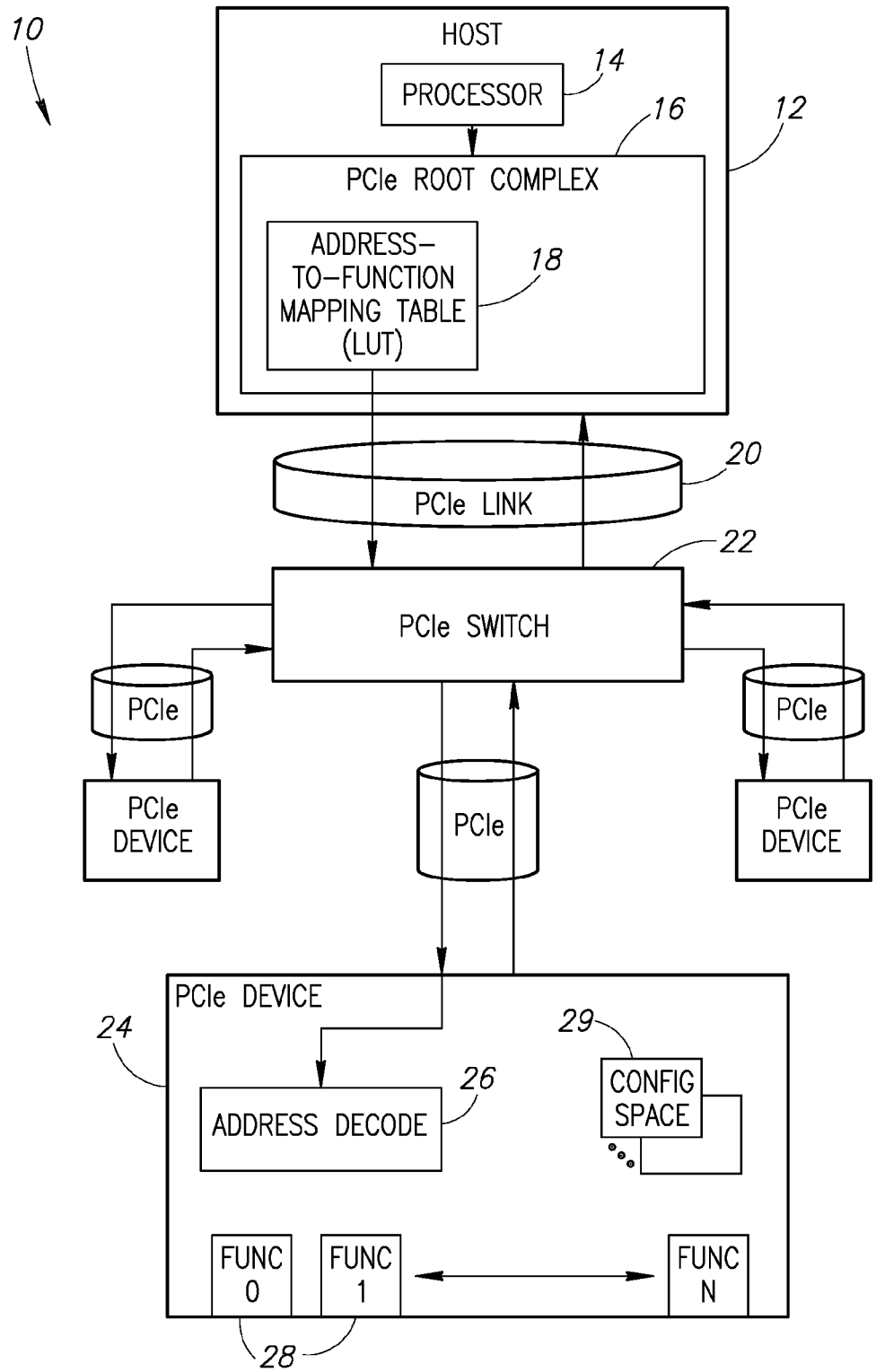
FIG. 1 is a block diagram illustrating an example PCIe network incorporating the PCIe fast address decode mechanism of the present invention.

Recent enhancements to the PCI Express (PCIe) standard such as Alternate RequestorID Interpretation (ARI) and Single Root I/O Virtualization (SR-IOV) introduce increased levels of multi-function applications integration on a single PCIe device. Such applications utilize a common PCIe connection to the host, shared between various functions implemented on the device. A system view illustrating an example PCIe network incorporating the PCIe fast address decode mechanism of the present invention is shown in FIG. 1.

The system, generally recognized 10, comprises a PCI host 12, PCIe switch 22 and a plurality of PCIe endpoints 24. The PCIe switch 22 is connected to the PCIe host and endpoints via PCI links 20. The PCIe host 12 comprises one or more processor cores 14 and a PCIe root complex 16 comprising an address to function mapping table 18. The PCIe endpoints 24 comprise an address decode circuit 26, a plurality of functions 0, 1, . . . N 28 and a plurality of configuration spaces 29.

Each function 28 implements its own PCIe configuration 29 providing a standard means of control over the operation of a function. A large portion of the configuration space logic of a function is dedicated to configure and control address regions allocated to this function. Each incoming transaction goes through address decode logic in order to determine the target device. The PCIe standard allows significant flexibility in address space allocation and programming, resulting in complex address decode logic that is required for each function.

Figure 2:
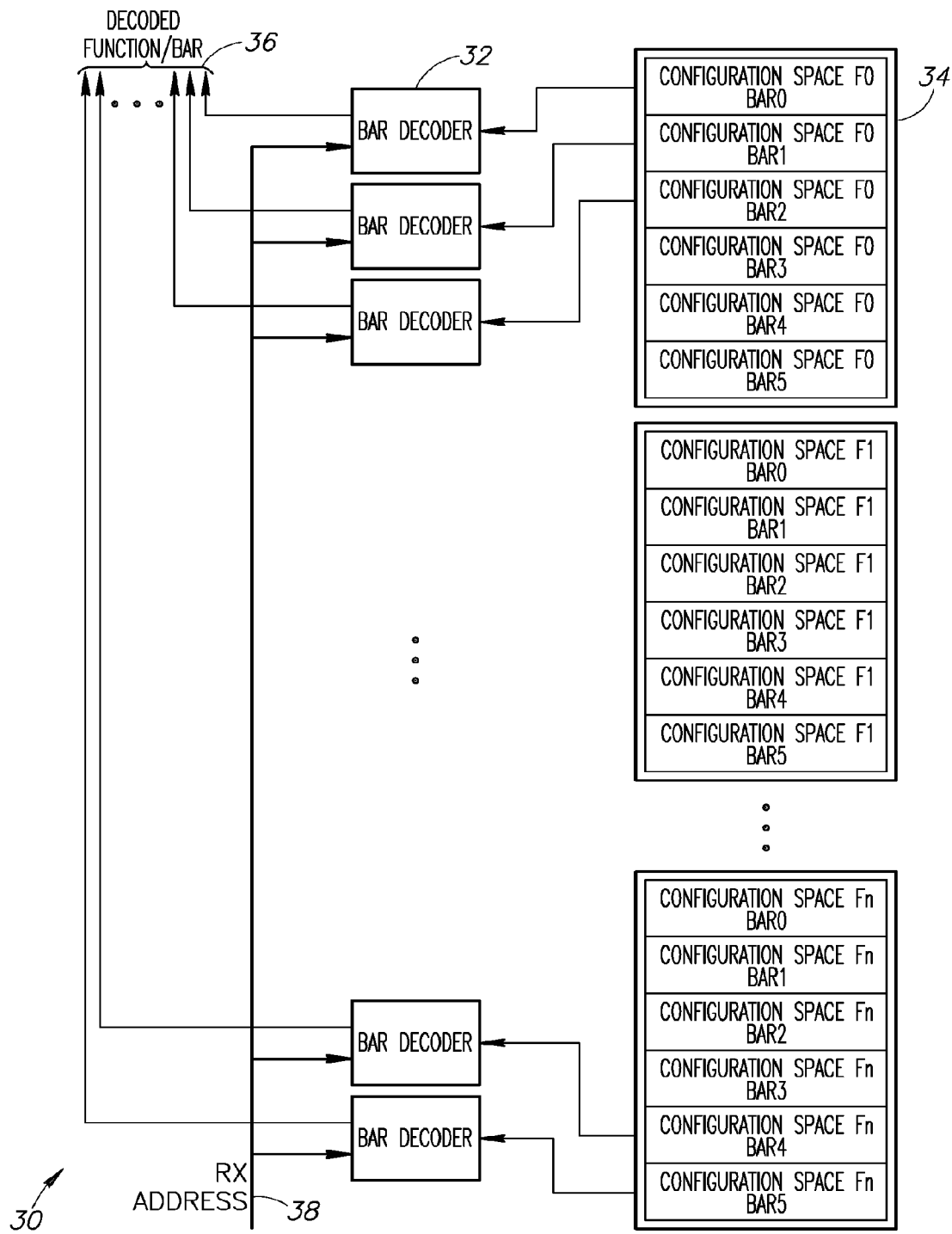
FIG. 2 is a diagram illustrating a first example parallel approach to address decode in a PCIe endpoint.

With the increased level of multi-function integration, logic designers face challenges in implementing fast and efficient address decode. One approach is to perform a parallel decode approach as shown in FIG. 2. The parallel scheme, generally referenced 30, comprises a plurality of configuration spaces F0, F1, . . . , Fn 34, BAR decoders 32 and RX address information 38. The RX address is applied in parallel to all the BAR decoders simultaneously to generate decoded function/BAR 36.

With the parallel decode approach, the PCI endpoint device implements dedicated decode logic (BAR decoder) for each function. The address decode is executed in parallel for all functions in a single step. This approach requires the use of numerous decode logic instances resulting in very large decode logic sizes with potential control signal routing problems.

Figure 3:
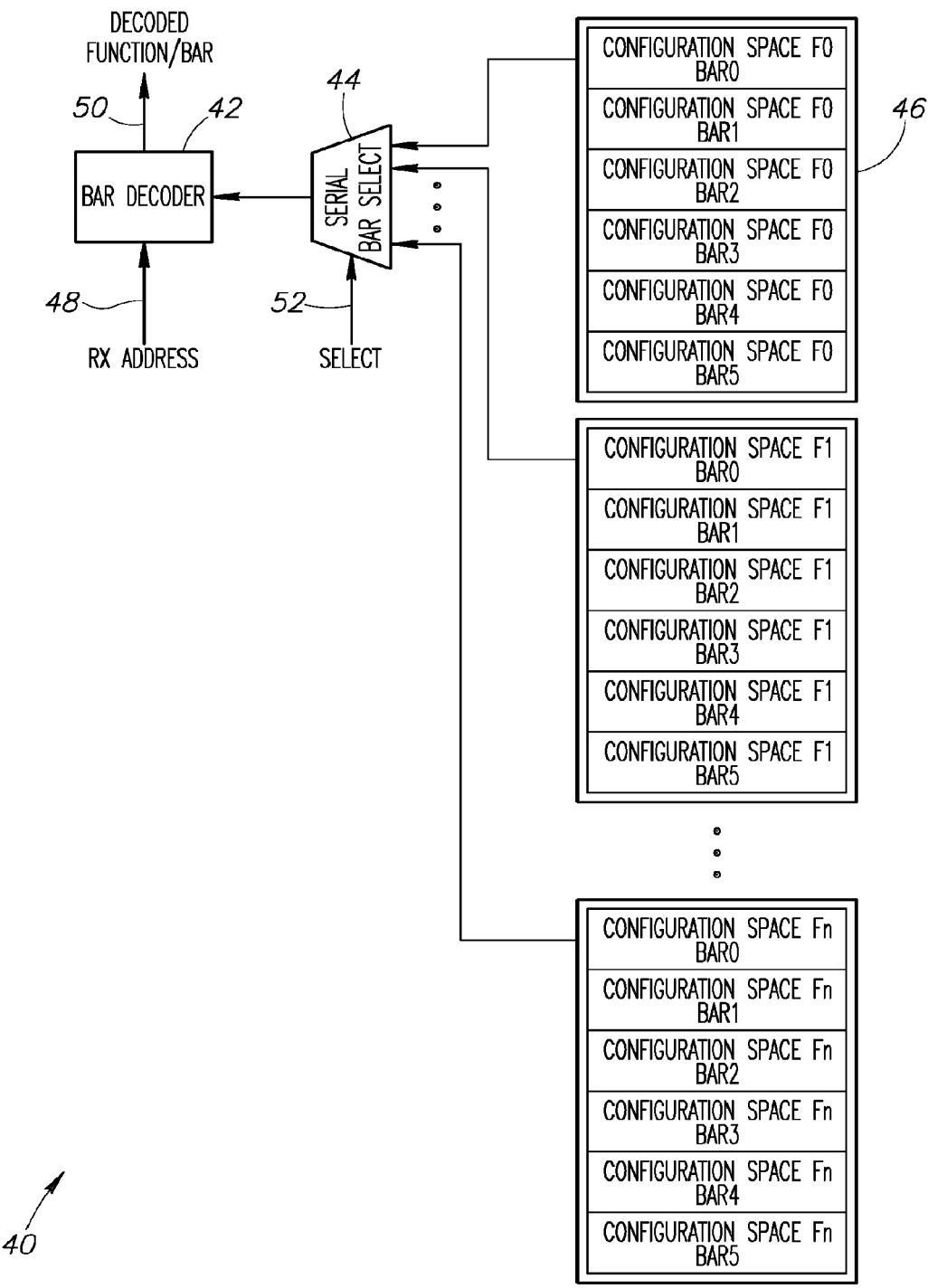
FIG. 3 is a diagram illustrating a second example sequential approach to address decode in a PCIe endpoint.

A second approach is to perform a sequential address decode as shown in FIG. 3. The sequential scheme, generally referenced 40, comprises a plurality of configuration spaces F0, F1, . . . , Fn 46, serial BAR select multiplexer 44 and BAR decoder 42. The Serial BAR select multiplexer receives the data from the configuration spaces 46 and select control 52. The BAR decoder circuit 42 receives the RX address information 48 received in the read/write request packet and the output of the serial BAR select multiplexer and is operative to generate the decoded function/BAR 50. The serial BAR select multiplexer sequentially selects each of the function configuration space data for matching by the BAR decoder 42.

With the sequential decode approach the endpoint performs an address decode for each supported function until the target function is identified. The address decode is performed using a single shared address decoder 42. Address decode is executed in multiple steps whereby in each step one of the functions loads its address configuration 46 into the decoder and decode results are evaluated. The decode sequence stops when a positive decode is determined. Although this approach utilizes minimal logic resources it requires significant decode latencies resulting in bandwidth degradation.

In a third approach, one or more decode directives (e.g., targeted function) are provided within the PCIe request header, thereby eliminating the need for target function search during the decode process in the endpoint. This enables single-decoder single-step decode implementation in complex multi-function devices.

Figure 4:
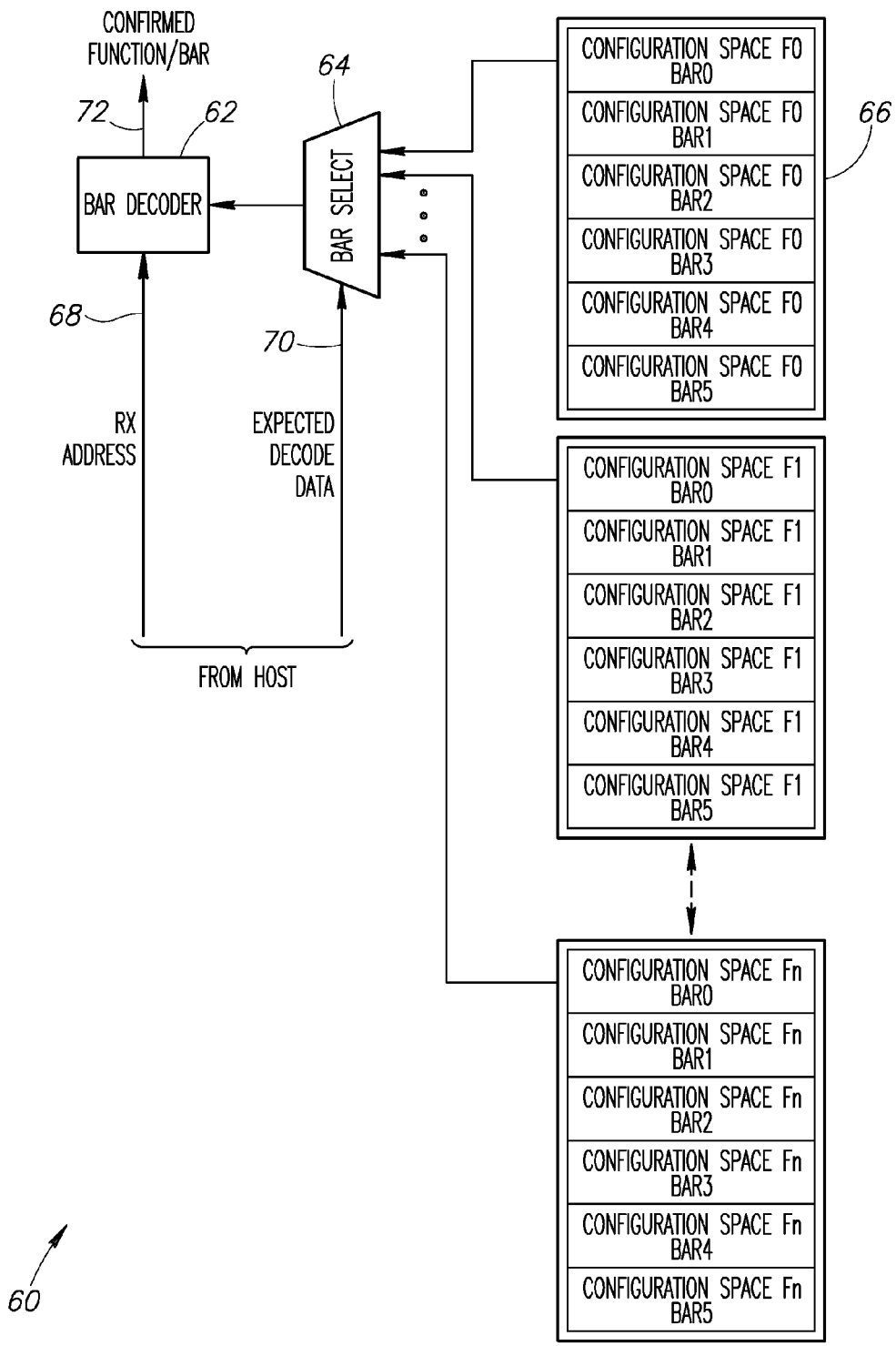
FIG. 4 is a diagram illustrating a third example parallel decode data approach to address decode in a PCIe endpoint.

A diagram illustrating a third example parallel decode data approach to address decode in a PCIe endpoint is shown in FIG. 4. The decode data scheme, generally referenced 60, comprises a plurality of configuration spaces F0, F1, ..., Fn 66, BAR select multiplexer 64 and BAR decoder 62. The BAR select multiplexer receives the data from the configuration spaces 66 and using expected decode data 70 received from the host selects one of the address configurations directly. The BAR decoder circuit 62 receives the RX address information 68 received in the read/write request packet and the output of the BAR select multiplexer 64 and is operative to generate the confirmed (or validated) function/BAR 72. The BAR select multiplexer selects the function configuration space data for matching (validating) by the BAR decoder 62.

In one embodiment, in accordance with the decode data mechanism, the PCIe host (or any other requestor) includes target function data in the PCIe request packet. PCIe functions in the endpoints implement configuration space capabilities that provide control over the use of target function decode information in the requests. Note that this feature may be optional. Thus, devices not implementing the decode data mechanism simply ignore target function data in the read/write request packet and perform address decode using either the parallel or sequential schemes described supra.

Figure 5:
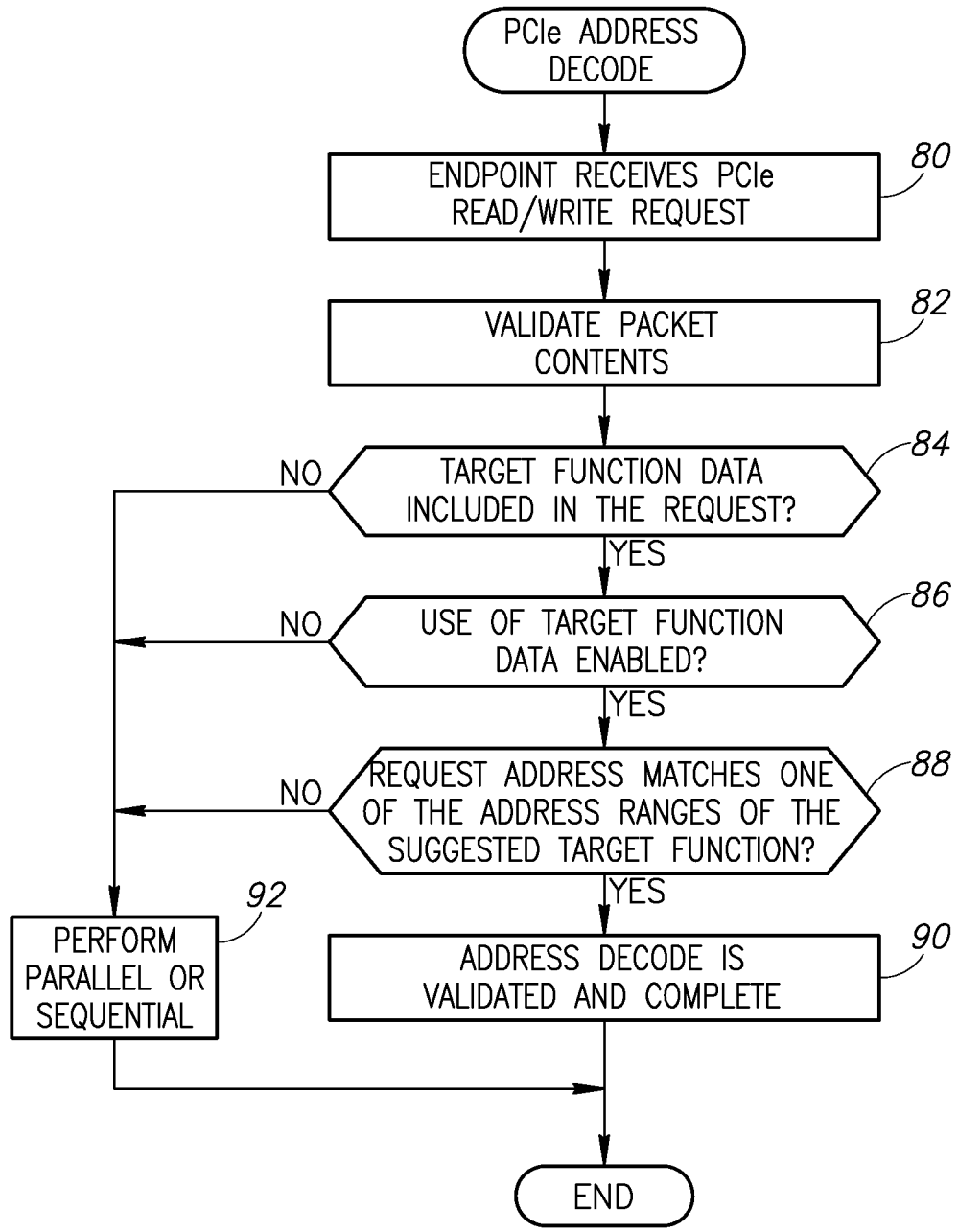
FIG. 5 is a flow diagram illustrating the PCIe fast address decode method of the present invention.

A flow diagram illustrating the PCIe fast address decode method of the present invention is shown in FIG. 5. The PCIe endpoint device receives a PCIe read/write request (step 80). The packet's contents are then validated as is normally performed (step 82). The PCIe endpoint checks if target function data has been included in the request packet (step 84).

The PCIe endpoint then checks if the use of target function data is enabled (step 86). Note that in one embodiment, the decode data feature may be controlled by the setting of a flag in the device configuration space. If target function data is not included in the request packet or the use of target function data is not enabled in the device configuration space, the endpoint device performs an address decode sequence using either the parallel or sequential schemes described supra (e.g., in the sequential scheme the endpoint performs an address decode for each supported function until the target function is identified) (step 92).

If target function data is present in the request packet and the use of target function data is enabled in the device configuration space, the endpoint device checks if the request address matches one of address ranges of the suggested target function (step 88). If target function address range is positively decoded, address decode is validated and complete (step 90). If the address range is not within the decoded configuration function address then the device endpoint may take further action, including, for example, report an error due to wrong use of target function data, or attempt a parallel or sequential address decode.

It is noted that it is not critical how the PCIe host performs the address range to target function mapping and how the target function information is conveyed to the endpoints. In one embodiment, the request initiator (e.g., the PCIe host) creates a mapping between PCIe address ranges and target devices/functions during the PCIe bus initialization phase. During this initialization phase host software scans all PCIe devices and functions, inquiring about their address range requirements and subsequently assigns address ranges. During this phase a table linking between address ranges and target functions is constructed in the host. This look up table is then used to assign target function attributes to requests issued to PCIe endpoints.

The target function data is incorporated into the PCIe request in any suitable manner, several possible examples are presented below.

In a first scheme, partial or complete target function data is included in PCIe request header bits that are normally reserved. In a second scheme, a PCIe header extension mechanism is used to accommodate function decode data. In a third scheme, target function data is included within a data payload, where a defined header field indicates the presence of target data in the payload. In a fourth scheme, target data replaces End-to-End Cyclic Redundancy Check (ECRC) metadata included at the end of the request packet.

A description of an example method for constructing the root port look-up table and determining target function number is described below. In one embodiment, the root port implements a fixed size look-up table that holds address to function number translations for a subset of address ranges with critical latency requirements. Requests to other functions are sent without the function decode. Note that this may incur higher processing latencies due to going through the sequential decode path.

First, the host software scans all PCIe devices' configuration spaces for address range requirements (e.g., e.g., the number of ranges for each device/function and range size). Note that typically this is a standard PCIe procedure. Second, the host software creates a memory map, assigning address ranges to devices/functions and writes base address values to functions' configuration spaces. Third, the host software creates a complete address to function mapping table for all PCIe ranges as PCIe ranges are assigned. This table is stored in the main memory Next, the host software initializes the root port mapping table with the address to function number mappings for performance critical functions. This table may be updated/reloaded on the fly to support changing system requirements. Next, the root port mapping table may serve as a local cache. For example, if a request does not find function information in the root port mapping table, its address is captured and the software routine is invoked to determine whether having a translation for this type of request is critical. If the software or other mechanism decides that translation is needed, function information is fetched from the mapping table in the main memory and stored in the local root port table. If the table is full, one of the existing entries may be deleted.

In one embodiment, the root port look-up table entry structure includes the following: (1) a valid bit; (2) the base address (e.g., up to 64 bits); (3) a range size which is system dependent and functions to indicate the $\log_2$ value of the range size (assuming ranges are always power-of-two); and (4) the target function information (e.g., up to 16 bits).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of PCI Express (PCIe) address decoding, said method comprising:
   providing a look up table in a PCIe host, said look up table operative to perform a mapping from an address range to a suggested target function decode directive, the look up table comprising at least a base address, a size of the address range, and target function information corresponding to the suggested target function decode directive;
   utilizing said look up table, sending a PCIe endpoint an address and suggested target function in a PCIe request packet;
   receiving the target function information at the PCIe endpoint;
   decoding at the PCIe endpoint the received address utilizing said suggested target function; and
   checking if the request address matches one of the address ranges of the suggested target function, and if so indicate that the address decode is complete.

2. The method according to claim 1, wherein said target function information is conveyed to said endpoint using normally reserved header bits.

3. The method according to claim 1, wherein said target function information is conveyed to said endpoint using a PCIe header extension.

4. The method according to claim 1, wherein said target function information is conveyed to said endpoint within a data payload with a field in a corresponding header indicating the presence of target function information in said payload.

5. The method according to claim 1, wherein said target function information is conveyed to said endpoint in place of End-to-end Cyclic Redundancy Checking (ECRC) meta-data normally included at the end of the packet.

6. A method of PCI Express (PCIe) address decoding for use in a PCIe host, said method comprising:
   providing a look up table in said PCIe host, said look up table operative to perform a mapping from an address range to a suggested target function decode directive, the look up table comprising at least a base address, a size of the address range, and target function information corresponding to the suggested target function decode directive;
   receiving PCIe requests, each having an address;
   determining a suggested target device function in accordance with each said address utilizing said look up table;
   assigning said suggested target functions to requests issued to PCIe endpoints; and
   wherein said suggested target functions and requests are transmitted to PCIe endpoints in a PCIe request packet.

7. The method according to claim 6, wherein said target function information is conveyed to said endpoint using normally reserved header bits.

8. The method according to claim 6, wherein said target function information is conveyed to said endpoint using a PCIe header extension.

9. The method according to claim 6, wherein said target function information is conveyed to said endpoint within a data payload with a field in a corresponding header indicating the presence of target function information in said payload.

10. The method according to claim 6, wherein said target function information is conveyed to said endpoint in place of End-to-end Cyclic Redundancy Checking (ECRC) meta-data normally included at the end of the packet.

11. A method of PCI Express (PCIe) address decoding for use in a PCIe host, said method comprising:
    scanning PCIe devices and functions during a PCIe bus initialization phase;
    assigning address ranges to target function decode directives;
    constructing a look up table mapping said address ranges to suggested target function decode directives, the look up table comprising at least a base address, a size of the address range, and target function information corresponding to the suggested target function decode directives;
    receiving PCIe requests, each having an address;
    for each request, determining a suggested target device function in accordance with each said address utilizing said look up table;
    assigning said suggested target functions to requests issued to PCIe endpoints; and
    wherein said suggested target functions and requests are transmitted to PCIe endpoints in a PCIe request packet.

12. The method according to claim 11, wherein said suggested target function information is conveyed to said endpoint using a PCIe header extension.

13. The method according to claim 11, further comprising sending a PCIe read/write request packet to a PCIe endpoint incorporating said request address and said target function information.

14. A method of PCI Express (PCIe) address decoding for use in a PCIe endpoint, said method comprising:
    receiving, in the PCIe endpoint, a read/write request packet from a PCIe host;
    determining if said request packet comprises suggested target function decode directive data;
    if so, decoding the received address utilizing said suggested target function;
    checking if the request address matches one of the address ranges of the suggested target function;
    if the target function address range is positively decoded, declare the address decode complete; and
    if the address range is not decoded in the PCIe endpoint, either reporting an error or performing a conventional decode, wherein the conventional decode comprises a parallel decode or a sequential decode.

15. The method according to claim 14, wherein said target function data is validated against Base Address Register (BAR) contents.

16. The method according to claim 14, wherein said target function information is conveyed to said endpoint using normally reserved header bits.

17. The method according to claim 14, wherein said target function information is conveyed to said endpoint using a PCIe header extension.

18. The method according to claim 14, wherein said target function information is conveyed to said endpoint within a data payload with a field in a corresponding header indicating the presence of target function information in said payload.

19. The method according to claim 14, wherein said target function information is conveyed to said endpoint in place of End-to-end Cyclic Redundancy Checking (ECRC) meta-data normally included at the end of the packet.

20. The method of claim 14, comprising constructing a table linking the address ranges and the suggested target function.

* * * * *